United States Patent [19]

McKenzie

[11] Patent Number: 4,482,383

[45] Date of Patent: Nov. 13, 1984

[54] POLYAMINE FLUID LOSS ADDITIVE FOR OIL WELL CEMENTS

[75] Inventor: Lee F. McKenzie, Arlington, Tex.

[73] Assignee: Hughes Tool Company, Houston, Tex.

[21] Appl. No.: 502,821

[22] Filed: Jun. 9, 1983

[51] Int. Cl.³ .................................................. C04B 7/35
[52] U.S. Cl. ...................................... 106/90; 106/314; 166/293
[58] Field of Search .................... 106/90, 314, 315; 166/293

[56] References Cited

U.S. PATENT DOCUMENTS

| | | | |
|---|---|---|---|
| 3,271,307 | 1/1967 | Dickson et al. | 166/288 |
| 3,500,929 | 3/1970 | Eilers et al. | 166/295 |
| 3,511,314 | 5/1970 | Scott et al. | 106/90 |
| 3,878,895 | 4/1975 | Wieland et al. | 166/294 |
| 4,007,128 | 2/1977 | Poklaki | 352/316 |
| 4,013,568 | 3/1977 | Fischer et al. | 252/8.5 |
| 4,088,583 | 5/1978 | Pyle et al. | 252/8.5 |

*Primary Examiner*—James Poer
*Attorney, Agent, or Firm*—Robert A. Felsman; Charles D. Gunter, Jr.

[57] ABSTRACT

An aqueous cement composition is shown for cementing the annular space between a pipe and the surrounding bore in a well. The cement composition includes a hydraulic cement, water present in an amount effective to produce a pumpable slurry, a polyamine fluid loss additive, and a sulfonated polymer. By neutralizing the polyamine to a pH of approximately 7, improved free water and fluid loss properties are imparted to the system.

2 Claims, No Drawings

POLYAMINE FLUID LOSS ADDITIVE FOR OIL WELL CEMENTS

BACKGROUND OF THE INVENTION

The importance of fluid loss control in primary oil well cementing has been recognized for many years. Adequate filtrate loss control is a major concern when cementing across any producing zone. As the cement slurry is being displaced across a permeable zone, it tends to lose fluid to that zone and, as a result, a filter cake tends to build up from the dehydrated cement particles. If the displacement process continues, the result can be a prematurely dehydrated cement slurry. The lost fluid from the cement slurry can also contaminate the surrounding formations.

The filtrate loss which results when a cement slurry does not contain fluid loss additives affects the thickening time of the slurry and the setting time with the result usually being premature setting of the cement slurry and a decrease in the compressive strength of the set cement column. Premature dehydration of a cement slurry can also cause flow of formation fluids into the well annulus, as well as between producing zones. When cement slurry filtrate loss is excessive, the filter cake can build radially inward from the permeable formation to the pipe, causing the annulus to be blocked off or bridged. Further displacement of the slurry is then prevented and the hydrostatic pressure originally trapped below the bridged area is reduced. If the slurry pressure is reduced to less than the pressure in any of the zones below the bridged area, intrusion of gas and fluid into the well annulus and between zones can occur.

Fluid loss additives are, therefore, used in oil well cement slurries to prevent problems associated with filtrate loss of the cement slurry, including: (1) excessive filter cake buildup, (2) prematurely dehydrated cement slurries, (3) filtrate damage to the surrounding producing formations, (4) changes in the thickening time of the cement slurry and the subsequent possibility of premature setting of the slurry, (5) changes in the setting time of the cement column and a resulting decrease in the compressive strength properties of the set cement, and (6) bridging in the annulus which can lead to flow of formation fluids into the annulus and between zones.

Polyamines, including polyethylenimines, are known to be highly effective cement fluid loss control additives when used with companion materials such as lignosulfonates, formaldehyde condensed napththalene sulfonates or other sulfonated polymers. A particular advantage of such systems is their ability to obtain very good fluid loss control at relatively low cement consistencies. Because of the low cement consistencies associated with polyethylenimine systems, settling and free-water can sometimes be a problem. Settling of the cement slurry can lead to a poor cementing job and increase the chance of communication between zones in the well. Salts such as calcium chloride have been added to fresh water cement slurries in the past in an attempt to control settling and free water problems where lignin based companion materials are used with polyamine fluid loss additives. The use of salts does not always eliminate all settling problems, adds to the cost of the slurry, and can damage salt sensitive formations.

There exists a need, therefore, for a polyamine fluid loss additive for oil well cements which is effective without producing settling and free water problems.

There exists a need for such a fluid loss additive which is economical to use and which does not greatly increase the cost of the cement slurry.

SUMMARY OF THE INVENTION

The aqueous cement compositions of the invention for cementing the annular space between a pipe and the surrounding bore in a well comprise a hydraulic cement, water present in an amount effective to produce a pumpable slurry, a sulfonated polymer, and a polyamine fluid loss additive where the polyamine is neutralized in pH. The polyamine is selected from the group consisting of polyalkylene polyamines, polyalkylenimines, and mixtures thereof, and preferably is a polyethylenimine. Preferably, the polyethylenimine is neutralized to a pH of approximately 7.

In the method of cementing the annular space between a pipe and the surrounding bore in a well of the invention, a pumpable slurry is first prepared comprising a hydraulic cement, mix water present in an amount effective to produce a pumpable slurry, a sulfonated polymer and a polyamine fluid loss additive having a neutral pH. The slurry is then pumped into the annular space between the pipe and the surrounding well bore and is allowed to set. Preferably the polyamine is a polyethylenimine having a pH of approximately 7.

Additional objects, features and advantages will be present in the written description which follows.

DETAILED DESCRIPTION OF THE INVENTION

The cement compositions of the invention include a hydraulic cement, water present in an amount effective to produce a pumpable slurry, a polyamine fluid loss additive, and a sulfonated polymer. A hydraulic cement is any cement that hardens or sets under water and is intended to include Portland cement, aluminous cements, Pozzolan cements, including lime, silica, or alumina, and including cements with minor amounts of other oxides such as iron oxide. Pozzolan cements include slag cements made from slaked lime and granulated blast furnace slag. The term hydraulic cement is also intended to include cements containing extenders such as bentonite and gilsonite and includes cements used with sand or other aggregate material and cements used in admixture with granular filling material such as limestone, pebbles, and the like.

The American Petroleum Institute has a publication (STD 10A) which covers the chemical and physical requirements, sampling, test methods, packaging, storage, and marking requirements for various classes of oil well cements and can be referred to for hydraulic cements suitable for use in the present invention.

Hydraulic cements are mixed with water and pumped into position in the well bore as an aqueous slurry. The amount of water used can vary depending upon the particular slurry requirements and upon such things as the ultimate strength which is necessary for the job at hand. Generally speaking, the addition of too little water results in non-uniform mixing of the components which can lead to the formation of weak spots in the column and such slurries are difficult to pump. The addition of too great an amount of water results in a decrease in the ultimate strength of the column when set and increased bulk in the slurry to be handled. As a result, the amount of water employed will be that which permits relatively easy pumping and yet sets in a column of adequate strength. Generally, the proportion of water to hydraulic cement in an aqueous cement slurry will be in the range from about 35 to 55 parts by weight of water per 100 parts by weight of hydraulic cement.

The polyamine component which forms a part of the present invention is selected from the class consisting of polyalkylenimines, polyalkylene polyamines, and mixtures thereof. The preferred polyalkylenimines are illustrated by polymerized ethylenimine or propylenimine. The preferred polyalkylene polyamines are illustrated by polyethylene and polypropylene-polyamines.

The average molecular weight of the polyamine compounds used in the present invention are generally greater than 400 and larger average molecular weights are preferred, being in the range from about 10,000 to 1,000,000 and higher. One known technique for preparing polyalkylenimines comprises mixing together an alkylenimine, a vicinal dihaloalkane as a catalyst, an alkali metal salt and a solvent and heating the continuously stirred mixture to accellerate polymerization of the alkylenimine monomer. The reaction mixture is subjected to a shearing force during the polymerization reaction period. Polyethylenimine can be prepared using this technique.

The most preferred polyamine is a polyalkylenimine which is commercially available from Cordova Chemical Company of North Muskegon, Mich., under the trademark "CORTAIN L-600" and is stated by the manufacturer to be 33% active.

The preferred polyamines of the invention are also neutralized in pH in the range of about 6–8, must preferably to an approximate pH of 7. Neutralization can be accomplished by adding an acid such as HCl or $H_2SO_4$ to the mix water or the polyamine can be neutralized during manufacture.

The amount of polyethylenimine employed in the cement slurries of the invention is in the range from about 8 to 50 gallons polyethylenimine per hundred sacks of cement. The amount of polyamine utilized will depend upon the existing well conditions including such factors as the bottom hole circulating temperature. Cement slurries of the present invention are generally effective at bottom hole circulating temperatures from about 100° F. to over 350° F.

The amount of mix water should be decreased to account for the volume of liquid fluid loss additive when mixing the slurries of the present invention so that the total fluid volume requirement of the slurry remains constant. For example, assume that a slurry design calls for 4.28 gallons of total fluid volume per sack of cement (gal/sk), and 10 gallons of fluid loss additive per hundred sacks of cement (ghs) or 0.10 gal/sk. The amount of fluid loss additive, 0.10 gal/sk, should be subtracted from the total fluid volume so that the amount of mix water used would be 4.18 gal/sk which when combined with the 0.10 gal/sk of fluid loss additive gives the necessary 4.28 gallons of total fluid volume per sack of cement.

The cement compositions of the present invention also contain a companion material for the polyamine in the form of a sulfonated polymer. The preferred sulfonated polymers are lignosulfonates and formaldehyde condensed napthalene sulfonates. The most preferred companion material is a lignosulfonate retarder type material of the type well known to those in the well cementing industry. Examples of suitable lignosulfonate retarders include the salts of lignosulfonic acid, e.g., calcium, sodium and ammonium lignosulfonate. The lignosulfonate retarder component will be present in the cement composition in varying amounts depending upon the well conditions and anticipated bottom hole temperature. The amount of lignosulfonate retarder utilized will generally be in the range of about 2 to 30 gallons per hundred sacks of cement, most preferably in the range from about 7 to 12 gallons per hundred sacks.

The following examples are intended to be illustrative of the invention without limiting the scope thereof:

EXAMPLES

In the course of comparing various commercially available polyamine fluid loss control additives, it was found that "CORTAIN L-600" gave significantly higher free-water than corresponding amounts of two other types of commercially available polyamines. To make the comparison, a cement slurry was prepared by mixing Class H Portland cement with 38% fresh water. The test results are shown in Table I.

TABLE I

| Additives in gallons per hundred sacks of cement (ghs) | | | | | |
|---|---|---|---|---|---|
| $CaCl_2$ 32% Solution | Ligno- sulfonate retarder | COR- TAIN L-600 | PURI- FLOC* C-31 | CYFLOC 6200 | % Free- Water @ 140° F. |
| 8 | 8 | 40 | | | 0.0 |
|   | 8 | 40 | | | 6.8 |
|   | 8 | 40* | | | 0.0 |
| 8 | 8 |    | 26.4 | | 0.0 |
|   | 8 |    | 26.4 | | 0.0 |
| 8 | 8 |    |      | 26.4 | Trace |
|   | 8 |    |      | 26.4 | 2.8 |

*"CORTAIN L-600" polyethylenimine was neutralized to pH 7 for this test run.
*PURIFLOC C-31 was supplied neutralized to a pH of 8.9.

Because "PURIFLOC C-31" and "CYFLOC 6200" are stated by the manufacturers to be 50% active while "CORTAIN L-600" is stated to be 33% active, a larger volume of "CORTAIN L-600" was used in the comparison.

In analyzing the comparative test results shown in Table I, one difference which was noted between the various commercially available polyethylenimines was that "CORTAIN L-600" was much more alkaline than either "CYFLOC 6200" or "PURIFLOC C-31". The pH's of these commercially available polyethylenimines are listed in Table II.

TABLE II

| Manufacturer | Material | pH |
|---|---|---|
| Cordova Chemical Company | CORTAIN L-600 | 10–11 |
| Dow Chemical Company | PURIFLOC C-31 | 8.9 |
| American Cyanamid | CYFLOC 6200 | 4–6 |

Experiments were then conducted to determine whether cement slurries with neutralized polyethylenimines would have less free water than those with unneutralized polyethylenimines. The "CORTAIN L-600" was neutralized to a pH of approximately 7 by adding 28% HCl to the mix water. Approximately 13 ghs of 28% of HCl were added for each 40 ghs of "CORTAIN L-600". Fluid loss tests were then conducted in accordance with recommended API procedure using Class H Portland cement with 38% fresh water as the base slurry. Tests were carried out at 140° F. The results are shown in Table III:

TABLE III

| Cement Brand | CaCl₂ 32% Solution | ligno-sulfonate (ghs) | CORTAIN L-600 (ghs) | Maximum Consistency (Bc) | 140° F. Free Water (%) | 140° F. Fluid Loss cc/30 min |
|---|---|---|---|---|---|---|
| Trinity | 8 | 8 | 40 | 12 | 0.0% | 325 |
| Trinity |   | 8 | 40 | 9 | 6.8 | — |
| Trinity |   | 8 | 40* | 11 | 0.0 | 70 |
| Alamo | 8 | 8 | 40 | 12 | — | 307 |
| Alamo |   | 8 | 40 | 9 | 3.0 | 14 |
| Alamo |   | 8 | 40* | 14 | 0.0 | 84 |

*In these runs, the polyethylenimine was neutralized to an approximate pH of 7.

As shown in Table III, the addition of neutralized polyethylenimine produced zero free water without the use of salt additives such as calcium chloride. The fluid loss of the slurries also improved with the use of neutralized polyethylenimines.

An invention has been provided with significant advantages. The aqueous cement compositions of the invention containing polyethylenimine fluid loss additives and lignosulfonate retarders have significantly less free water and improved fluid loss characteristics over cement compositions containing unneutralized polyamines. The polyamines can be neutralized in the mix water by the addition of a suitable acid or can be provided in neutralized form from the manufacturer. The use of neutralized polyamines reduces or eliminates the need for salts in fresh water-lignin based retarder cement systems. The elimination of salts results in a cost savings and lessens the possibility of damaging salt sensitive formations.

I claim:

1. An aqueous cement composition for cementing the annular space between a pipe and the surrounding bore in a well, having zero free water content and fluid loss characteristics of less than about 85 cc/30 minutes at 140° F., comprising:
   a hydraulic cement;
   water present in an amount effective to produce a pumpable slurry;
   a polyamine fluid loss additive, said polyamine being selected from the group consisting of polyalkylenepolyamines, polyalkylenimines and mixtures thereof, and said polyamine being neutralized in pH within the range of 6 to 8; and
   a lignosulfonate retarder material selected from the group consisting of calcium, sodium and ammonium lignosulfonate.

2. A method of cementing the annular space between a pipe and the surrounding bore in a well, comprising:
   preparing a pumpable slurry comprising a hydraulic cement, mix water present in an amount effective to produce a pumpable slurry, a lignosulfonate retarder material selected from the group consisting of calcium, sodium and ammonium lignosulfonate, and a polyamine fluid loss additive having a neutral pH, said polyamine fluid loss additive being selected from the group consisting of polyalkylenepolyamines, polyalkylenimines and mixtures thereof, and said polyamine being neutralized in pH within the range of 6 to 8;
   pumping said slurry into said annular space between the pipe and surrounding well bore; and
   allowing said slurry to set.

* * * * *